United States Patent [19]

Jackson

[11] 3,812,836
[45] May 28, 1974

[54] PORTABLE KNOCKDOWN OVEN
[76] Inventor: William B. Jackson, 1256 Laurel Hill Dr., San Mateo, Calif. 94402
[22] Filed: Sept. 27, 1972
[21] Appl. No.: 292,541

[52] U.S. Cl. .................................. 126/9 R, 248/172
[51] Int. Cl. ................................................ F24c 1/16
[58] Field of Search......... 126/9 R, 25 A, 9 A, 25 R, 126/30; 99/499; 248/172, 188.1; 211/175

[56] References Cited
UNITED STATES PATENTS

| | | | |
|---|---|---|---|
| 1,156,773 | 10/1915 | Gordon | 126/9 R |
| 1,458,409 | 6/1923 | Higham | 126/9 R |
| 1,709,289 | 4/1929 | Tatum | 126/29 |
| 1,984,001 | 12/1934 | Tanzer et al. | 248/172 X |
| 2,780,215 | 2/1957 | Vacanti, Jr. | 126/25 A X |
| 3,342,122 | 9/1967 | Blinn | 126/25 A X |
| 3,537,388 | 11/1970 | Martin | 126/30 X |

Primary Examiner—Carroll B. Dority, Jr.
Assistant Examiner—Harold Joyce
Attorney, Agent, or Firm—Robert W. Dilts

[57] ABSTRACT

A portable oven is disclosed having a knockdown enclosure with removable side and end members. A heat-proof cover may be provided for enclosing the top, sides and ends thereof. The oven may further include a grill rack for receiving food desired to be cooked in the oven and a fire pan tray on which the rack is set for receiving charcoal or the like. Optionally, the oven may be covered with aluminum foil, thus providing a completely portable knockdown oven.

5 Claims, 6 Drawing Figures

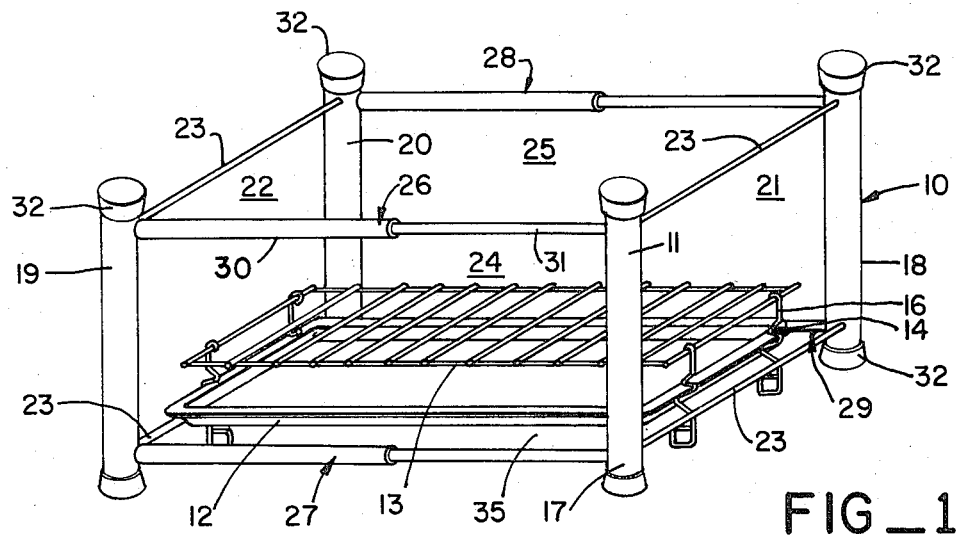
FIG_1
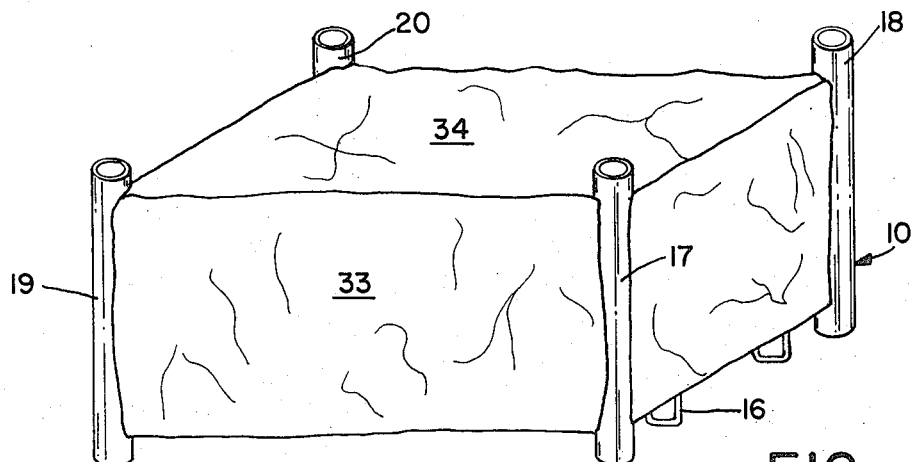
FIG_2
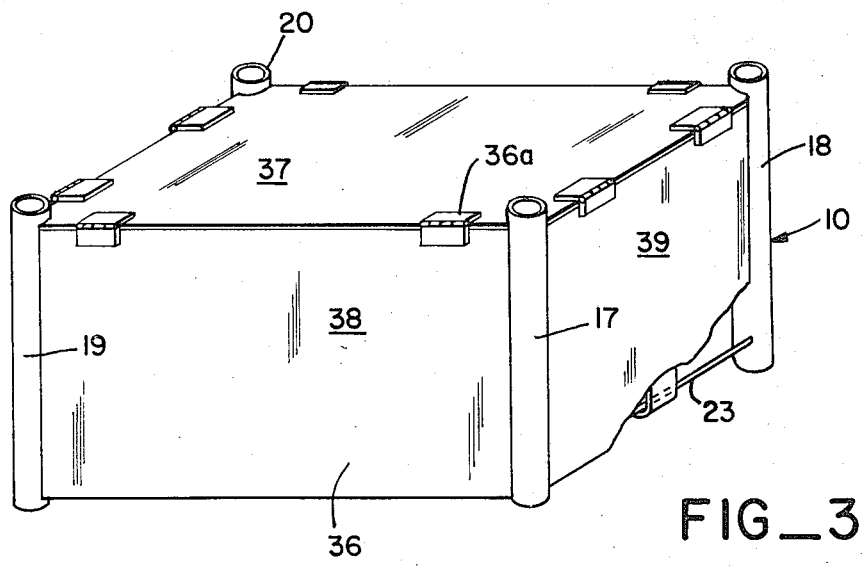
FIG_3

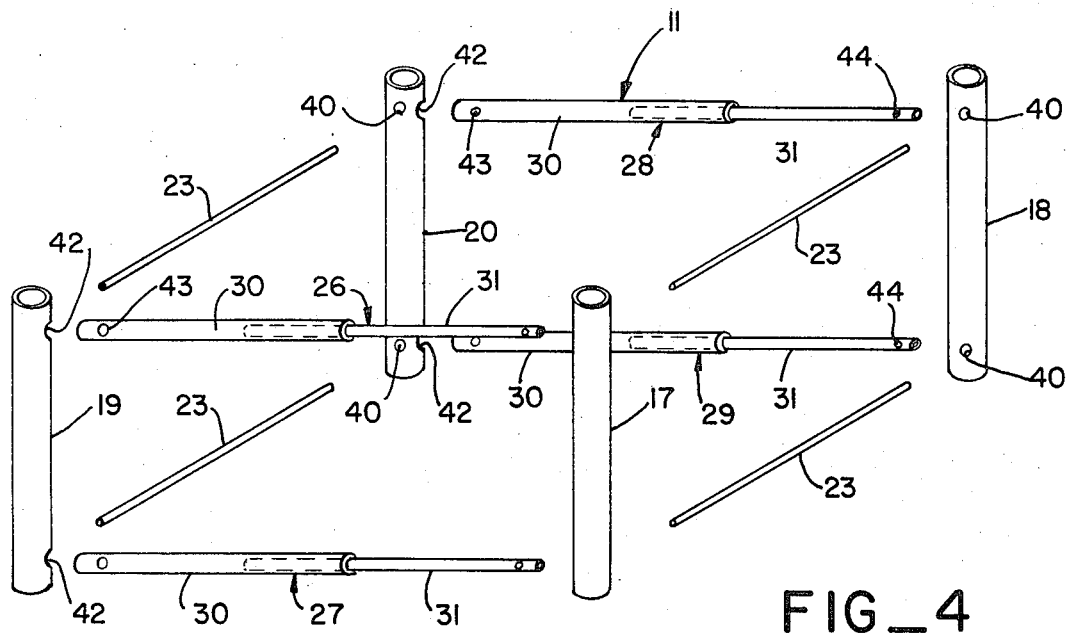
FIG_4
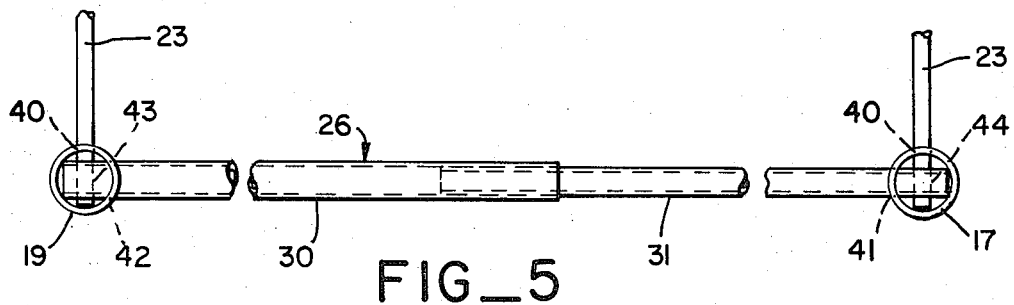
FIG_5
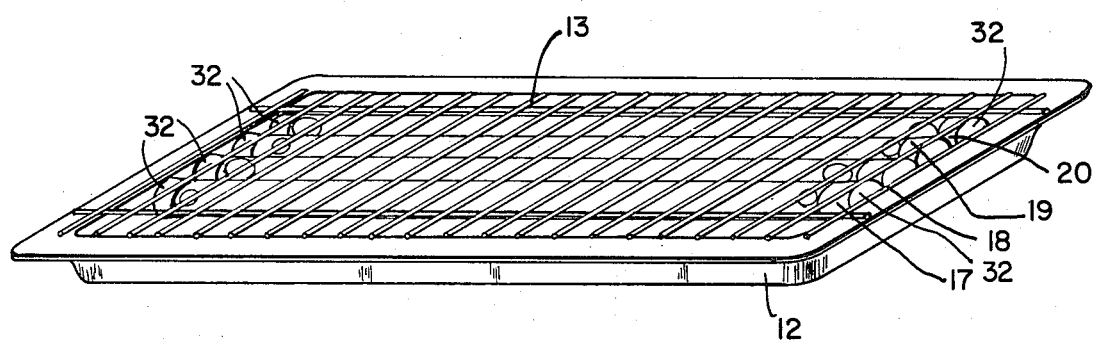
FIG_6

3,812,836

PORTABLE KNOCKDOWN OVEN

BACKGROUND OF THE INVENTION

1. Field of the Invention

The invention relates to ovens; and, more particularly, to a portable knockdown oven for use by campers or the like.

2. Description of the Prior Art

Various types of portable ovens are available. These ovens may be broadly classified into three categories: first, those ovens which are to be used with particular brands and styles of stoves and thus are relatively expensive; second, those ovens which are foldable and of the reflector type, that is, rely upon the reflection of heat to carry out the cooking process. These ovens are generally relatively inexpensive but are usually inefficient and open on one or more sides, thus subjecting the oven to the elements, such as wind or the like, which reduces the efficiency thereof. Finally, there exist ovens of the heat-convection type which include a completely enclosed cover and an integral heating element. These latter ovens are relatively expensive and bulky.

There exists a need for an oven which can be both heat-convecting or heat-reflecting and of a portable nature. Such an oven should be as inexpensive as possible, free from exposure to the elements, yet very efficient in the time required for cooking various foods therein.

SUMMARY OF THE INVENTION

It is an object of this invention to provide a completely portable knockdown oven which can utilize both heat-convection and heat-reflection to efficiently cook foods therein.

It is a further object of this invention to provide such an oven which can be economically manufactured, be completely knocked down into an easily carried position and be quickly erected.

It is a still further object of this invention to provide such an oven which can utilize relatively inexpensive aluminum foil readily available to a camper or the like to complete the enclosure means.

These and other objects are preferably accomplished by providing a portable oven having a knockdown enclosure with removable side and end members and a heat-proof cover may be provided for enclosing the top, sides and ends thereof. The oven may further include a grill rack for receiving food desired to be cooked in the oven and a fire pan tray on which the rack is set for receiving charcoal or the like. Optionally, the oven may be covered with aluminum foil, thus providing a completely portable knockdown oven.

BRIEF DESCRIPTION OF THE DRAWING

FIG. 1 is a perspective view showing the knockdown enclosure and heating means alone of the oven of my invention;

FIG. 2 is a view of the oven of FIG. 1 showing the enclosure thereof covered with aluminum foil;

FIG. 3 is a view of the oven of FIG. 1 showing the enclosure thereof covered with foldable sheet metal;

FIG. 4 is an exploded view of the various components making up the enclosure of the oven of my invention;

FIG. 5 is a top plan view of one side of the oven showing the interconnection of the framework thereof; and FIG. 6 is a perspective view of the knocked-down oven of my invention.

DESCRIPTION OF THE PREFERRED EMBODIMENT

Referring to FIG. 1 of the drawing, the oven 10 of my invention is shown having an outer box-like enclosure 11 and an internal combustible-material-receiving fire pan tray 12 having a grill rack 13 associated therewith. The fire pan 12 may be of any suitable type. Rack 13 may also be any suitable rack and of a size to support tray 12. Rack 13 may also include integral or foldable legs 16 having notches 14 of varying heights for supporting tray 12 thereon and thus raising or lowering food carried thereby with respect to the heat source.

The dimensions of the tray 12 and rack 13 may be chosen so that the entire unit is covered by and internal of the enclosure 11 for reasons to be discussed shortly. Any suitable combustible material may be burned upon tray 12, such as charcoal, wood coals, or the like.

As can be seen in FIG. 1, enclosure 11 includes four corner leg members 17 through 20 which may be of hollow metallic tubing, such as lightweight aluminum or the like. The sides 21 and 22 of enclosure 11 are formed by side leg support members 23 which may be of solid material or metallic tubing, such as lightweight aluminum or the like. These support members 23 are disposed adjacent the top and bottom, respectively, of the corner leg members 17 through 20.

The front 24 and back 25 of enclosure 11 are formed by four sets (26 through 29) of telescoping members, preferably of hollow metallic tubing, such as lightweight aluminum or the like. Each set 26 through 29 includes a pair of telescoping members 30 and 31, the smaller member 31 telescoping into the larger member 30. Finally, the corner leg members 17 through 20 may be capped at the bottoms and tops thereof by suitable heat-resistant cap members 32.

The particular means of connection of leg members 17 through 20 to the leg support members 23 and the sets 26 through 29 of the telescoping members will be more clearly brought out hereinbelow with regard to the discussion of FIGS. 4 and 5. At any rate, the respective members interlock to form a complete enclosure for tray 12 and rack 13, yet can be quickly and easily knocked down for transportation and storage thereof.

Referring now to FIG. 2, the various members of the enclosure 11 of FIG. 1 may be covered by conventional aluminum foil 33. Such foil is preferably of the heavy-duty type and is shown in FIG. 2 as covering the front 24, back 25, sides 21 and 22, and top 34 of enclosure 11. Generally, this type of foil is sold in rolls of about 18 inches or so in length and may be torn or cut to fit the respective members. For example, my oven 10 may be about 18 inches or so in overall length, 14 inches or so in overall width and 14 inches or so in overall height. Thus, no cutting or tearing of the aluminum foil may be necessary to cover the front 24, back 25 and top 34 of enclosure 11 — however, cutting or tearing and overlapping of the foil pieces may be required to cover sides 21 and 22.

The open bottom 35 (not visible in FIG. 2) of enclosure 11 is left uncovered for obvious reasons. Such foil may be supplied or the user of my oven 10 may provide his own foil and this foil may be reusable or replaced as desired, thus eliminating unpleasant cleaning details. Further, the intersection of various sections of the foil may be secured at one or more points with conventional cellophane tape or the like. I have found that it is not necessary that all junctions of the various pieces of foil be so taped, nor is it necessary that every gap of enclosure 11 be tightly sealed. The edges of the foil are preferably crimped about the respective abutting members.

However, it may be desirable to provide a more permanent cover for the oven 10 of my invention. Such a cover is shown in FIG. 3 and may be a cover 36 of conventional sheet metal or the like (or any suitable sheet-like heat-resistant material). Thus, cover 36, as shown in FIG. 3, may include a generally rectangular main body panel 37 hingedly connected to front and back panels 38 and side panels 39. Any suitable hinging means may be used, such as hinge 36a, sufficient to enable the sides and top and back panels to be folded onto main body portion 37 so that a planar easily stored cover is obtained. If desired, the panels may also be secured at the bottom as shown by any suitable means, such as resilient fingers 36b which grasp the various bottom tubular members as shown.

Of course, the dimensions given hereinabove are purely arbitrary. The telescoping feature of members 30 and 31 enables the oven 10 to be varied in its lengthwise dimension.

In operation, the legs 16 of rack 13 are spread to full open position and fire pan tray 12 is inserted between the legs 16 and rests upon the preselected set of notches 14, depending upon the height of the grill desired with respect to the material being cooked. Charcoal briquettes or the like are placed in the fire pan tray 12, ignited, and when the flames have died down, the enclosure 11 (having either aluminum foil 33 thereon or the sheet metal cover 36) is placed over the tray 12 and rack 13 to completely enclose them. Oven 10 is now complete. If desired, a suitable oven thermometer (not shown) may be provided. The spacing at the bottom of oven 10 does not affect the cooking of the materials. The food being cooked is completely enclosed and there is no danger from wind, rain or the like. If aluminum foil is used, reflection therefrom aids in the cooking process. If sheet metal is used — which may be aluminum — both reflected and/or convected heat may be obtained.

Any foods that may be cooked in a conventional gas or electric oven may be cooked in the oven 10 of my invention. The sheet metal cover 36 is slightly more stable and has a greater resistance to wind than the aluminum foil cover 33. However, the foil used may be heavy duty, used again and again, and replaced very easily and economically when necessary.

Referring now to FIGS. 4 through 6, the unique knockdown and assembly feature of my oven 10 will be described. Although such features may be described with respect to certain dimensions or materials, obviously any suitable heat-resistant materials may be used along with any suitable dimensions for carrying out the invention. I have found that the dimensions used are preferred for a standard-sized grill and tray combination which will handle even roasts or larger-sized meats without difficulty.

Thus, referring specifically to FIG. 4, enclosure 11 includes the four corner leg members 17 through 20. The side leg support members 23 are removably secured within suitable apertures 40 formed in the top and bottom of each leg member 17 through 20. Of course, for reasons of providing a stable enclosure, apertures 40 are generally located the same distance from the top and bottom of each leg member 17 through 20. Further, apertures 40 need extend through only one wall thereof.

A second set of apertures 41 are formed at the top and bottom of leg members 17 and 18. A third set of apertures 42 are formed at the top and bottom of leg members 19 and 20. Both the second and third sets of apertures 41 and 42 need extend through only one wall of leg members 17 through 20 are located at generally the same distance from the top and bottom of the leg members 17 through 20 as are apertures 40. That is, the central longitudinal axes of apertures 41 and 42 intersect the central longitudinal axes of apertures 40 and are generally normal thereto. The apertures 42 are slightly greater in cross section than apertures 41 for reasons to be discussed shortly.

Each of the telescoping sets 26 through 29 include the smaller diameter member 31 which is removably inserted into apertures 41 (see FIG. 5) and the larger-diameter members 30 which are inserted into apertures 42. The diameter of these apertures are all preselected to provide a snug fit for their respective members.

Referring now to FIG. 5, the open tops of corner leg members 17 and 19 are shown with end caps 32 removed therefrom and a telescoping set 26 secured in place. The remaining corner leg members 18 and 20 are similarly assembled at both the top and bottom thereof. Thus, each larger-diameter telescoping member 30 has in turn an aperture 43 extending completely therethrough for removably receiving the respective free end of side leg support member 23 therein. Each smaller-diameter telescoping member 31 has in turn an aperture 44 extending completely therethrough for removably receiving the respective free end of side leg support member 23 therein. Of course, the diameters of apertures 43 and 44 are selected to provide a snug fit for the respective members.

As discussed hereinabove, all of the various members need not be tubular and can, of course, vary in configuration with the respective apertures being also so configured. The diameter of the various members may also vary. However, if hollow members are used for leg members 17 through 20 of a greater inner diameter than members 30 and members 23 (which may be solid) can be inserted inside hollow members 31, the two members 23 and 31 may then be telescoped into member 30, and the resulting three members 23, 30 and 31 may be telescoped into a corner leg member (17 through 20). Suitable dimensions for carrying this out may be leg members of about 1 inch in diameter; members 30 of about one-half inch in diameter; members 31 of about three-eighths inch in diameter and members 23 of about one-fourth inch in diameter. Due to the lengths selected for the various members, my oven 10 may be packaged and/or stored as shown in FIG. 6. Thus, the leg members 17 through 20 include therein the various members 23, 30 and 31 are shown resting on top of tray 12. The legs (not visible) of grill rack 13 are folded and the rack 13 is placed on top of leg members 17 through 20. If desired, the folded sheet metal cover 36 of FIG. 3 may be included (also not shown). Finally, caps 32 hold the various members in place within members 17 through 20.

The oven 11 of my invention may thus be readily assembled into the FIG. 1 configuration. The oven 11 may be expanded or contracted lengthwise to adjust the size thereof. If aluminum foil is used, it is merely cut or torn to size and crimped about the respective members. It may also be secured at one or more suitable points with tape or the like. After use, the foil may be removed if desired and the oven 11 quickly broken down with few parts requiring cleaning. If cover 36 is used, it is merely folded up, cleaned and packed away with the remaining components.

It can be seen from the foregoing that I have disclosed a highly efficient and economical yet completely portable oven. The oven 11 of my invention may be used by campers or the like in a manner taking up very little space during non-use, yet erects quickly and easily to form a compact unit. The unique enclosure 11 of my invention may be provided either alone (and thus accommodate the conventional pre-existing grill and tray of the user) or with the grill and tray described. Since enclosure 11 may be varied in its lengthwise dimension, it can be adapted to be used with many inexpensive grill and tray combinations on the market, such as the well-known hibachi-type grills. Further, if it is provided with a grill and tray, these latter components may of course be used separately to grill meats or the like, an additional advantage of my oven. Finally, the cover 36 may be provided at added cost or the user may purchase the enclosure 11 alone (and provide his own grill rack and tray) at lesser cost and further provide his own aluminum foil. The advantages of both heat-convection and -reflection may be obtained with my unique oven.

Finally, the cooking times of various foods may be calculated and provided with my oven so that users thereof would have a ready reference of average cooking times. I have found that these times do not appreciably differ during use of my oven under various heat and weather conditions.

I claim as my invention:

1. A knockdown enclosure for a portable oven comprising:
   a. four tubular corner leg members of equal length, each of said leg members having a first aperture of first given cross-section through the sidewall thereof with its axis perpendicular to the axis of said leg member adjacent one end thereof, each of said leg members having a second aperture of said first given cross-section through the sidewall thereof with its axis perpendicular to the axis of said leg member adjacent the other end thereof, the centers of said first and second apertures lying on a common line parallel to the axis of said leg member, each of said leg members having a third aperture of cross-section larger than said first given cross-section through the sidewall thereof with its axis perpendicular to the axis of said leg member adjacent said one end thereof, the axis of said third aperture transversely intersecting the axis of said first aperture at the axis of said leg member, each of said leg members having a fourth aperture of larger cross-section than said first given cross-section through the sidewall thereof with its axis perpendicular to the axis of said leg member adjacent said other end thereof, the axis of said fourth aperture transversely intersecting the axis of said second aperture at the axis of said leg member, the centers of said third and fourth apertures lying on a common line parallel to the axis of said leg member, the third and fourth apertures through the sidewalls of two of said leg members all being of second given cross-section and the third and fourth apertures through the sidewalls of the other two leg members being of third given cross-section larger than said second given cross-section;
   b. four sets of telescoping leg support members of equal lengths when retracted, each set including a first tubular member and a second tubular member, said first tubular member having an external cross-section adapted to fit into said apertures of said third given cross-section and an internal cross-section corresponding to said second given cross-section, and said second tubular member having an external cross-section adapted to fit into said apertures of said second given cross-section and an internal cross-section corresponding to said first cross-section, one end of said second tubular member being adapted to be received into one end of said first tubular member and said first and second tubular members each having an aperture of said first given cross-section therethrough perpendicular to its axis adjacent the free end thereof; and
   c. four side leg support members of equal length each having an external cross-section adapted to fit into said apertures of said first given cross-section.

2. The oven enclosure of claim 1 wherein said corner leg members, said telescoping leg support members and said side leg support members are all generally circular in cross-section and all of said apertures are generally circular in cross-section.

3. The oven enclosure of claim 2 wherein the length of said sets of telescoping leg support members, when retracted, and the length of said side leg support members are not greater than said length of said corner leg members.

4. The oven enclosure of claim 2 including eight removable cap members adapted to selectively close the ends of said corner leg members.

5. The oven enclosure of claim 4 wherein said corner leg members are fourteen inches long and made of aluminum tubing about one inch in outer diameter, said first tubular member of each of said sets of telescoping leg support members is about fourteen inches long and made of aluminum tubing about one half inch in outer diameter; said second tubular member of each of said sets of telescoping leg support members is about fourteen inches long and made of aluminum tubing about three eights inch in outer diameter; and said side leg support members are about fourteen inches long and made of aluminum tubing about one quarter inch in outer diameter, all of said aluminum tubing of which said members are made having a wall thickness of about one sixteenth inch.

* * * * *